April 5, 1938.  E. W. VREDENBURG  2,112,977
AUTOMATIC WEIGHING SCALE
Original Filed Oct. 23, 1935   3 Sheets-Sheet 2
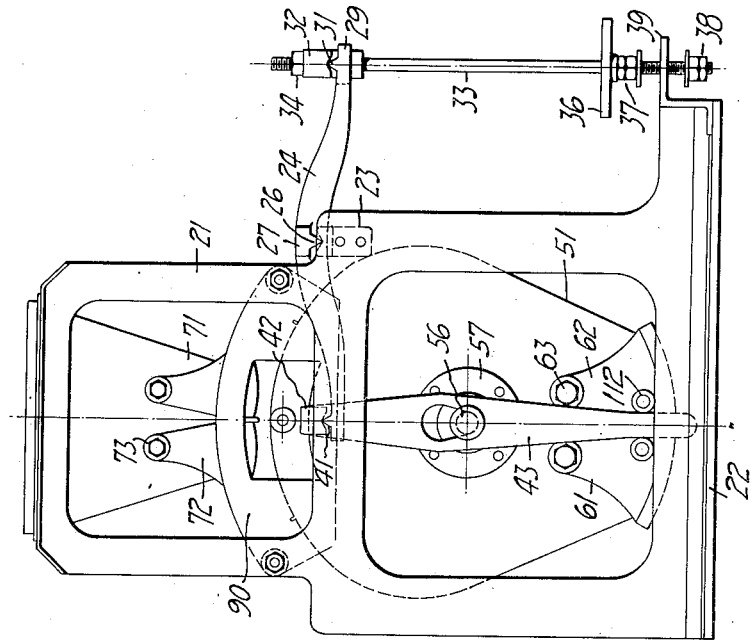
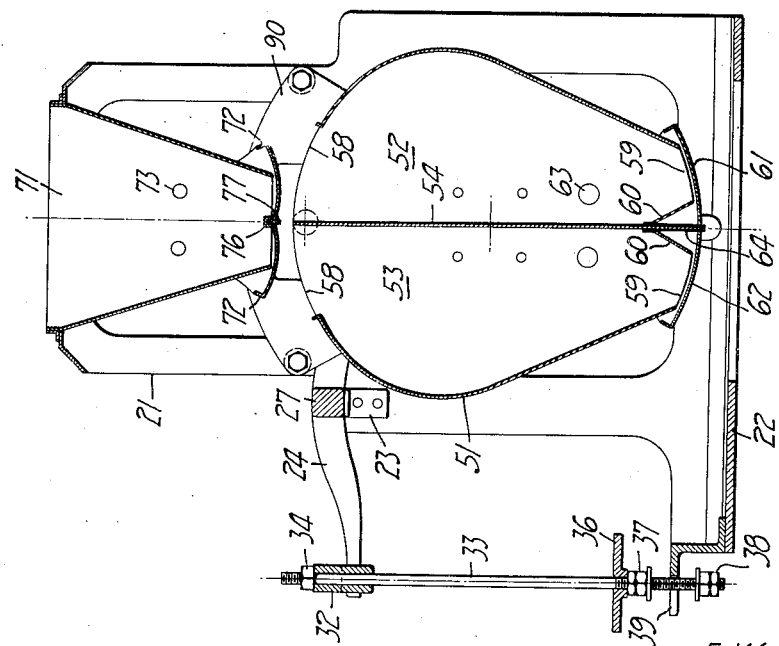
INVENTOR.
E. W. Vredenburg
BY
Robert N. Eckhoff
ATTORNEY.

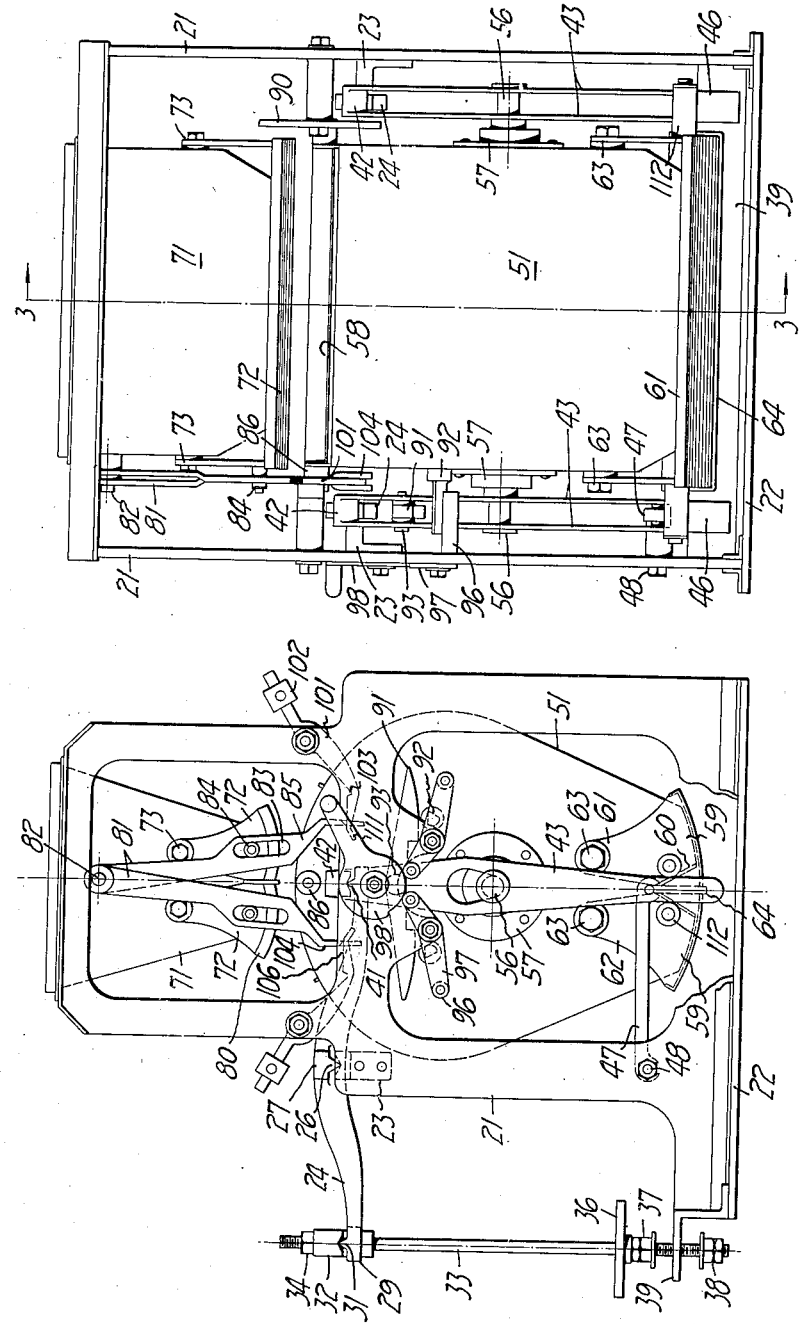

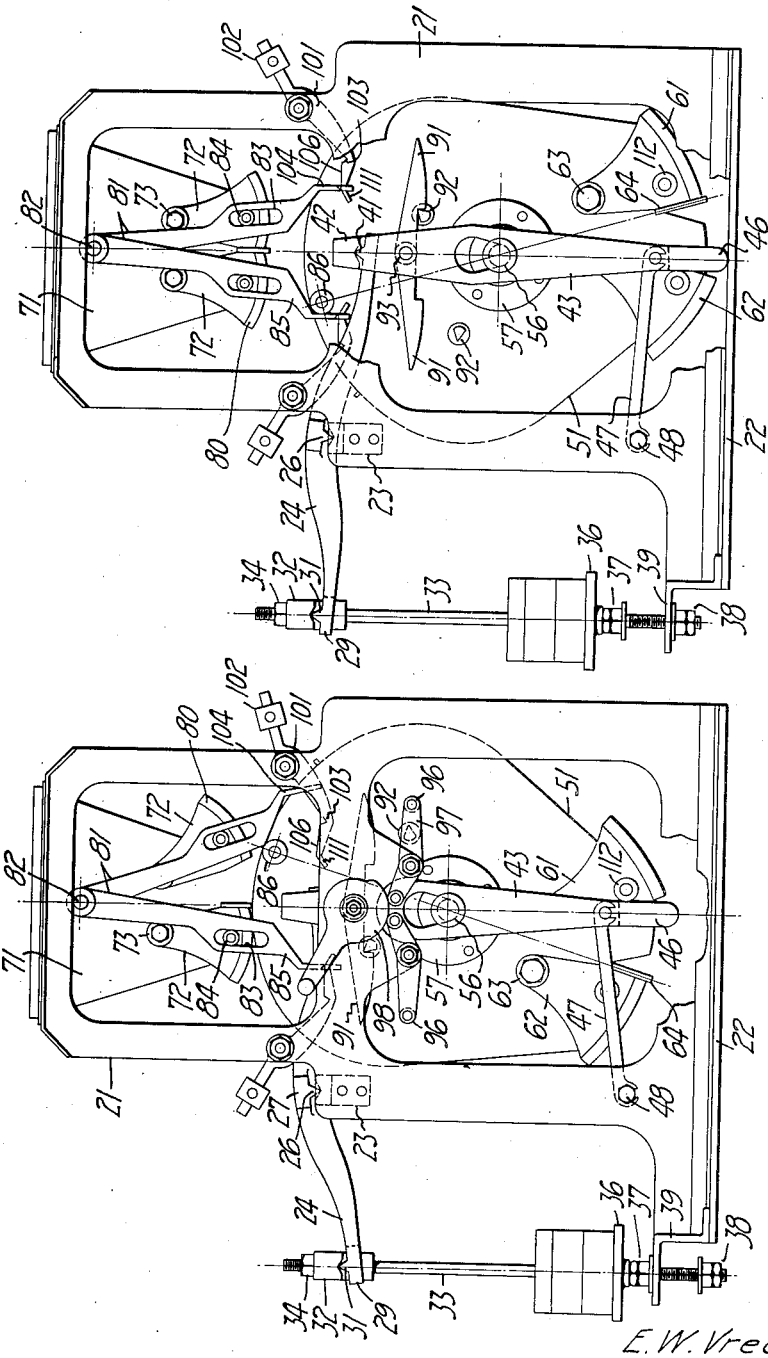

Patented Apr. 5, 1938

2,112,977

UNITED STATES PATENT OFFICE 2,112,977

AUTOMATIC WEIGHING SCALE

Edric W. Vredenburg, Oakland, Calif.

Application October 23, 1935, Serial No. 46,239
Renewed September 7, 1937

21 Claims. (Cl. 249—33)

This invention relates to an automatic weighing scale.

It is an object of the present invention to provide a batch weighing scale in which the weighing range can be varied without affecting the accuracy of the scale or causing it to fail to operate properly.

Another object of the present invention is to provide a batch weighing scale permitting regulation of the speed of operation of the scale without the necessity of changing parts or stopping operation of the scale for any considerable period of time.

Another object of the present invention is to provide a scale which can be used in weighing a substantially constant stream of material. In this connection it is to be pointed out that the scale of the present invention is so fashioned that a substantially continuous flow of material can occur to the scale.

A further object of the present invention is to provide a batch weighing scale in which shock and vibration are substantially eliminated.

A further object of the present invention is to provide a batch scale adaptable to any dry, free-flowing material.

A still further object of the present invention is to provide a batch scale in which the scale can be readily adapted to operate upon any dry, free-flowing material irrespective of the density thereof.

The invention includes other numerous objects and features of advantage, some of which, together with the foregoing will appear hereinafter wherein a present preferred embodiment of the scale of this invention has been disclosed.

In the drawings accompanying and forming a part hereof:

Figure 1 is a side elevation.

Figure 2 is an end elevation.

Figure 3 is a section taken along the line 3—3 in Figure 2, showing the hopper construction.

Figure 4 is a rear elevation.

Figure 5 and Figure 6 are side elevations illustrating operation of the scale.

The weighing mechanism

As appears in Figures 1 and 2, the scale of the present invention includes a frame 21 supported upon a suitable base 22. Pivot blocks 23 are mounted upon the frame on opposite sides thereof and provide pivot points for certain weighing mechanism to be presently described.

The weighing mechanism includes two arms 24 carrying pivots 26 which ride in the pivot blocks 23. The arms are secured together by a transverse member 27 adjacent the pivot blocks and by a transverse member 29 at one end of the arms 24. A weight carrying structure is mounted upon transverse member 29, this member having pivot 31 thereon upon which a pivot block 32 rides. The pivot block 32 is drilled out to pass a rod 33 which is retained in place upon the block by nut 34. A weight platform 36 is secured to the rod and nuts 37 and 38 on the end of the rod cooperate with fork 39, secured to the base 22, to limit travel of the weighing mechanism, as will presently appear. On the other end of the arms 24 is provided pivots 41. These support pivot blocks 42 placed between composite members 43. Composite members 43 are made up of two flat members joined together by the pivot blocks 42 and by block 46. The composite members are guided for parallel movement by links 47. Each link extends from a stud 48, placed on the frame of the machine on the line of center of the pivot block 23, to a pin on each of the composite members.

The weighing mechanism carries the counterbalancing weight and the weight of the load to be handled. It is to be noted that the composite members are guided for parallel vertical movement between the two extreme positions shown in Figures 5 and 6.

The hopper

The hopper 51 is made up of an arcuate sheet metal structure and is divided into a right hand compartment 52 and a left hand compartment 53, the compartments being divided by common dividing wall 54. The hopper is mounted between studs 56 extending from composite members 43, the studs 56 extending into suitable bearings 57 provided upon each side of the hopper. Each compartment has an inlet 58 and an outlet 59. It is to be noted that member 60 is secured to each side of the common wall, while the bottom of the hopper is flared in to restrict outlet 59 so that discharge therefrom occurs by flow of the material and not by a sudden release detrimental to the scale.

To control release of material from the hopper and to retain material therein during weighing, doors 61 and 62 are extended beneath the outlets, the doors being supported from pivots 63. In Figure 3 it is to be noted that the doors are shown in section and as engaging a common resilient member 64. When either compartment of the hopper is filled with material the members 60 divert the load of material away from the resilient member and keep the material away from the contact line whereat the doors engage the resilient member 64 so that each hopper compartment is tight and material is retained until it is to be discharged.

The hopper compartment filling mechanism

Suspended from the top of the frame is a receiving hopper 71, usually formed of sheet metal, extending across the weighing hopper 51. Two like doors 72 extend beneath the hopper 71 and are supported for an oscillatory movement by pins 73. It is to be noted that the hopper is divided by a transverse member 76 which extends across the hopper 71. This transverse member includes a resilient member 77 which is engaged by the doors 72. The transverse member 76 shields a considerable portion of each door from the load of the material in the receiving hopper 71 so that, when the door engages the resilient member, material can be retained and the contact edge of the door against the resilient member does not have to bear the load of material above it. In this manner the receiving hopper is effectively sealed and dribbling of the material does not occur after the weighing operation has been completed. The hopper is flared at 70 to restrict the outlet from each side of the hopper 71.

The feed control mechanism

Means are provided for controlling the feed from the receiving hopper 71 into the main hopper 51. These mechanisms are identical and a description of one will suffice for the other.

Arms 81 extend from a common pivot point 82 adjacent the top of the receiving hopper. These arms include slots 83 in which rollers 84 on each door are positioned. The arms 81 include fingers 85 which are engaged by one of the two rollers 86 carried by the hopper. Thus, as appears in Figure 5, one of the rollers 86 moves an arm 81 when the hopper 51 has oscillated to one side or the other, and then rises as the weight in the discharging compartment lessens.

It is to be noted that the right hand door controls feed into the left hand compartment of the hopper while the left hand door controls feed into the right hand compartment of the hopper. Material discharged into the left hand hopper, as appears in Figure 5, causes the hopper to become unbalanced and creates a force tending to oscillate the hopper counter-clockwise, as appears in Figure 5, due to the fact that the load in the left hand compartment of the hopper exerts a force off center with respect to the support of the hopper on studs 56. Oscillatory movement of the hopper is limited by the other roller 86 engaging the stop provided by an aperture in plate 90 into which the roller extends (see Figure 4).

The hopper is retained in an extreme position by suitable means. Right and left hand locking dogs 91 are supported from a common pin 93 on composite member 43. When the hopper swings to either right or left the proper dog engages a projection 92 on the hopper and retains the hopper temporarily against oscillatory movement. It is to be noted, however, that the hopper, being supported between the vertically movable members 43 is free to move vertically between that upper extreme position shown in Figure 5 and the lower extreme position shown in Figure 6. Since the common pin support 93 for the left dog is carried on the composite member 43 the hopper is not released and permitted to swing unless the latching dog 91, the one retaining the hopper temporarily latched, is released. Downward movement of the hopper carries the latching dogs into engagement with one of the pins 96. These pins are mounted upon arms 97 hinged on the frame and normally in position to trip and release that dog latching the hopper against oscillation.

Means are provided for disabling the hopper latching means. This disabling means comprises a cam 98 mounted upon the frame and adapted to be oscillated to raise and lower the arms 97 and thus lower the pins 96 from that position in which they will trip either latching dogs, to a position in which they will not, and downward movement of the hopper will not result in release of the latched dog.

As the hopper begins to fill, it moves downwardly and carries roller 86 away from extension 85 on the arm 81. This movement, however, is not permitted to interrupt feeding of the material, means being provided to maintain the flow rate of the material even though the hopper moves downwardly. This means comprises two bell cranks 101 mounted upon the frame. A weight 102 is mounted upon one arm of each bell crank to permit an adjustment in the rate of operation of the feeding mechanism. The other arm of the bell crank includes a notch 103 which engages the end of extension 85 and latches the door of the hopper 71 in an open position. The extension 85 includes a forked end 104, the tines of the forked end extending on either side of the arm of bell crank 101 to maintain the two in engagement. It is to be noted that beyond the notch 103 the bell crank arm includes an upwardly extending cam surface 106. This drags upon the extension 85 after the extension has been released from the notch 103 and causes the closing door to move very slowly to its closed position with the result that a slow dribble of material into the hopper being filled is secured.

The foregoing operation is facilitated by a counter weight 80 placed on each door 72. These serve several purposes. For example, when the hopper is nearly full, the counter weight forces the hopper down, arm 81 and extension 85 pressing on roller 86, so the door closes partly and the last batch portion dribbles in until the weight limit is reached. When the door closes, it does so in a quick and positive manner, while opening thereof takes up some of the shock when the hopper rises and roller 86 engages arm 81 and extension 85 thereon. In this manner a very accurate weighing of the batch can be secured, the final filling being at a rate reduced with respect to the rate initially employed. The result of this is that the scale of this invention is very fast in operation and accurate, as well. On a twenty-five pound scale weighing a dry material such as wheat or ammonium sulfate, I have been able to secure operation at the rate of fifteen dumps per minute continuously.

The batch release mechanism

As the hopper fills, it descends vertically while the rate of feed of the material is gradually reduced until the extension 85 latches in the notch 103. In this position the receiving hopper continues to discharge into one of the compartments until the hopper descends to such a point that the roller 86 engages extension 111 on an arm of the bell crank 101 and trips the latch provided by engagement of extension 85 with the notch 103. This cuts off the feeding of material.

Operation

While the operation is believed to be apparent from the foregoing description, and while it has been dealt with more or less fully heretofore, a supplemental summary of operation will be given.

If the hopper has not been used it will be in the central position shown in Figure 1. It is to be noted that the cam for raising and lowering the arms 97 is there shown in such a position that the pins 96 will not engage the latching dogs 91. It is therefore necessary to rotate the cam counter-clockwise to that position in which it appears in Figure 5.

To start the hopper into operation, material being delivered into the receiving hopper 71, it is only necessary to rock the hopper by hand to either the right or the left. Assuming that it is rocked clockwise into that position in which it appears in Figure 5, the roller 86 will engage extension 85 and door 72 will open. The extent of initial opening of the door is controlled by the relation existing between roller 86 and extension 85. In the device shown the roller 86 can be caused to contact the extension 85 early or late in its travel, by permitting the scale weighing mechanism to raise the roller 86 to a higher position so that only a few degrees of oscillation bring the roller 86 into contact with the extension 85 and the door 72 opens. This adjustment is either effected by varying the positions of nuts 37 and 38 on rod 33.

As material flows into the hopper, the hopper being supported between the vertical composite members 43 moves downwardly and roller 86 moves along the cam track provided by extension 85 until extension 85 engages notch 103 and the bell crank 101 latches arm 81 in position. This condition continues until the hopper has been filled to such an extent that the roller 86 contacts the extension 111 and releases the latch, permitting final closing of the door, the material continuing to dribble in until the door actually closes. It is to be noted that when the roller 86 leaves arm 81 and until it engages extension 111 the hopper is free. The extension 111 is not engaged until the hopper is up to weight.

The hopper is now free to oscillate, the locking dog 91 having engaged pin 96 and the dog being raised. The hopper quickly swings over into that position into which it appears in Figure 6.

It is to be remembered that in that position shown in Figure 5 the left hand hopper has been filled with material. Since the weight of this material is off center with respect to the pivotal support of the hopper, the hopper oscillates to the left with the result that roller 112 on door 62 is brought into contact with the composite member and the door is oscillated in a clockwise direction to that position in which it appears in Figure 6 and in which it discharges material from the compartment 53.

In Figure 6 the hopper has only partly oscillated in the counter-clockwise direction, the roller 86 being against the extension 85. The hopper is still discharging material and will commence to raise to move roller 86 over extension 85. Then the door on the receiving hopper will open and material will start to discharge into the compartment 52. It is to be noted that in Figure 6 the latching dog is shown as being practically in that position in which it will latch the hopper against oscillatory movement due to discharge of material into compartment 52. Material by discharging into the compartment 52, takes up the shock and vibration attendant upon release of the batch weighed and released.

Adjustment and variation in the rate of material weighed out by the scale is secured by changing the weights on the platform 36. The rate of operation, the number of batches delivered per minute is varied by changing the adjustment on nuts 37 and 38 as well as by adjusting the position of the counter-weights 102 on bell cranks 101.

If it is desired to use the scale as a weighing scale as well as a dispensing scale, as in filling sacks of material up to a certain weight, it is only necessary to oscillate the cam controlling the position of pins 96. Thus if the scale is operated with the cam in that position in which it appears in Figure 1, the filled compartment will not dump until the cam is rotated. If the cam is rotated to that position in which it is shown in Figure 5 and then returned to the position in which it is shown in Figure 1, the filled hopper will discharge while the other hopper will fill but will not discharge until the cam is again rotated.

I claim:

1. In a device of the character described, a hopper divided into a first compartment and a second compartment, a pivoted frame movable between an upper and a lower position and supporting said hopper for vertical movement, means on said frame supporting said hopper on said frame for oscillatory movement between a first and a second position, means for delivering a material to be weighed into a batch into one of said compartments to move said pivoted frame vertically, means for coordinating rate of delivery of material to the extent of initial vertical rising movement of said frame, and means for maintaining delivery of said material during filling of either of said compartments substantially independent of the position of said frame between said positions.

2. In a device of the character described, a hopper divided into a first compartment and a second compartment, a pivoted frame supporting said hopper for vertical movement, means on said frame supporting said hopper on said frame for oscillatory movement, between a first and a second position, means for delivering a material to be weighed into a batch into one of said compartments to move said pivoted frame vertically, means for coordinating maximum rate of delivery of material to the extent of initial vertical rising movement of said hopper and for finally cutting off delivery of material upon a predetermined downward vertical movement of said frame, and means for maintaining delivery of material into a compartment substantially independently of movement of said frame.

3. In a device of the character described, a weighing frame mounted for hinged movement in two directions, a hopper divided into a first and a second compartment, means supporting said hopper for movement with said frame and for oscillation relative to said frame, between two extreme positions, means for delivering material to said hopper including another hopper having two outlets, each outlet discharging into only one of said compartments, a separate door for each outlet, and operating means for each door, each operating means being independent of the other and operable upon upward vertical movement of said hopper to discharge material.

4. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, and means for operating said closure means including a member having a cam track thereon cooperating with a cam follower to move said closure means upon relative movement between said track and said follower by said hopper and to an extent dependent upon said limiting means.

5. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, and means for operating said closure means including a member having a cam track thereon cooperating with a cam follower movable by said hopper to move said closure means upon vertical movement of said hopper to an extent dependent upon said limiting means.

6. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, means for operating said closure means including a member having a cam track thereon cooperating with a cam follower to move said closure means upon relative movement between said track and said follower by said hopper and to open said closure means to an extent dependent upon said limiting means, and means for locking said closure means in an open position upon downward movement of said hopper to release said hopper for accurate filling.

7. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, means for operating said closure means including a member having a cam track thereon cooperating with a cam follower movable by said hopper to move said closure means upon vertical movement of said hopper to open said closure means to an extent dependent upon said limiting means, and means for locking said closure means in an open position upon downward movement of said hopper to release said hopper for accurate filling.

8. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, means for operating said closure means including a member having a cam track thereon cooperating with a cam follower to move said closure means upon relative movement between said track and said follower by said hopper and to open said closure means to an extent dependent upon said limiting means, means for locking said closure means in an open position upon downward movement of said hopper to release said hopper for accurate filling, and means for releasing said locking means when said hopper is filled.

9. In a device of the character described, a support, weighing beams hinged on said support for an up and down oscillatory movement, an oscillating weighing compartment hopper carried by said beams, means for limiting oscillatory movement of said beams, a feed hopper having an outlet for feeding into said weighing hopper, closure means for said outlet, means for operating said closure means including a member having a cam track thereon cooperating with a cam follower movable by said hopper to move said closure means upon vertical movement of said hopper to open said closure means to an extent dependent upon said limiting means, means for locking said closure means in an open position upon downward movement of said hopper to release said hopper for accurate filling, and means for releasing said locking means when said hopper is filled.

10. In a device of the character described, a feed hopper, means for discharging material from said hopper, an oscillating weighing hopper having compartments selectively filled to weigh out batches of material, a weighing frame including a pair of hinged arms supporting said hopper for oscillation and for vertical rising movement, means for varying the extent of rise of said hopper, means operable to an extent coordinated with the extent of rise of said hopper to vary rate of material discharge from said discharge means, and means for releasing material from a filled compartment including a door for each compartment independent of the door on any other compartment and operable to release material from a filled compartment until said hopper has substantially completed an oscillation.

11. In a device of the character described, a hopper oscillatable between two positions, a feeding hopper having two outlets, a closure for each of said outlets, each closure being hinged to rock over said outlet, an arm for rocking each of said closures, each arm having a cam track thereon, and a cam follower moved by said hopper on said cam track to engage each of said arms to move its closure.

12. In a device of the character described, a hopper oscillatable between two positions, a feeding hopper having two outlets, a closure for each of said outlets, each closure being hinged to rock over said outlet, an arm for rocking each of said closures, each arm having a cam track thereon, and a cam follower moved by said hopper on said cam track to engage each of said arms to move its closure to open its outlet, and means for latching said moved arm in a closure open position wherein said hopper is independent of said arm.

13. In a device of the character described, a supporting frame, a hopper having two separate compartments therein, and means for supporting said hopper for a vertical movement and for an oscillating movement comprising two pair of horizontal parallel links, each pair of said links being separately hinged on said frame and extending on one side of their hinge points substantially an equal distance, an element joining each of said pairs of links on said one side of said hinge points and on each side of said hopper, and means hinging said hopper between said elements.

14. In a device of the character described, a supporting frame, a hopper having two separate compartments therein, and means for supporting said hopper for a vertical movement and for an oscillating movement comprising two pair of horizontal parallel links hinged on said frame and extending on one side of their hinge points and an element joining each of said pairs of links on said one side of said hinge points and on each side of said hopper, and means hinging said hopper between said elements, said hopper having a door for releasing material in each compartment, each door being hinged on said hopper and being movable independently of the other door.

15. In a device of the character described, a hopper divided into a first and a second compartment, means supporting said hopper for oscillation and for a vertical movement between an upper position and a lower position, material delivery means, means for initiating material delivery into a compartment upon rising of said hopper into said upper position, and means for maintaining material delivery during filling of said compartment substantially independent of said hopper and said supporting means until said hopper is in substantially said lower position.

16. In a device of the character described, a hopper divided into a first and a second compartment, means supporting said hopper for oscillation and for a vertical movement between an upper position and a lower position, material delivery means, means for initiating material delivery at a relatively high rate into a compartment upon rising of said hopper into said upper position, means for maintaining material delivery during filling of said compartment substantially independent of said hopper and said supporting means until said hopper is in substantially said lower position, and means for finally dribbling material into said filling compartment.

17. In a device of the character described, a hopper, a frame supporting said hopper for oscillation between two extreme positions, means supporting said frame for a vertical movement between an upper and a lower position, said hopper having two separate discharge outlets, a door for each outlet, each door being hinged on said hopper independent of the other door and swinging freely on said hopper, and means engaging each of said doors only upon oscillation of said hopper back and forth between said positions to open each of said doors selectively in turn.

18. In a device of the character described, a hopper, a frame supporting said hopper for oscillation between two extreme positions, means supporting said frame for a vertical movement between an upper and a lower position, said hopper having two separate discharge outlets, a door for each outlet, each door being hinged on said hopper independent of the other door and swinging freely on said hopper, said frame including a depending portion extending between said doors and engaging each of said doors only upon oscillation of said hopper back and forth between said positions to open each of said doors selectively in turn.

19. In a device of the character described, a hopper, a frame supporting said hopper for oscillation between two extreme positions, means supporting said frame for a vertical movement between an upper and a lower position, a wall dividing said hopper into two compartments each having its discharge outlet, means continuing said wall in each compartment and extending away from said wall to restrict each outlet, a door for each outlet, each door being hinged on said hopper independent of the other door and swinging freely on said hopper over and beyond its outlet to engage said wall, said frame including a depending portion extending between said doors and engaging each of said doors only upon oscillation of said hopper back and forth between said positions to open each of said doors selectively in turn.

20. In a device of the character described, a weighing device consisting of an oscillatably mounted reciprocating hopper, a wall dividing said hopper into two compartments and forming separate outlets therefrom at the bottom of said hopper, a door for each outlet, arms on each door extending upwardly along opposite sides of said hopper, said arms and door forming a unitary structure, and means hinging the arms on each door on said hopper adjacent to said wall and off-center with respect to said unitary structure whereby said structures hang from said hopper when said hopper is in a vertical position and are urged toward said wall.

21. A hopper weighing device comprising a two compartment hopper, means separating said hopper to provide therein two outlets therefrom adjacent each other at the hopper bottom, a door movable over each outlet to open and close said outlet, and means hinging each door on said hopper from a point above said door whereby said door swings freely over its outlet upon oscillation of said hopper, said hinging means being positioned on said hopper between the middle of said door and said separating means to support said door off-center with respect to hinging means when said hopper is in a vertical position.

EDRIC W. VREDENBURG.